United States Patent
Takeda (10) Patent No.: US 10,872,494 B2
(45) Date of Patent: Dec. 22, 2020

(54) SYSTEM CAPABLE OF ADDING MULTI-CURRENCY FUNCTION

(71) Applicants: Universal Entertainment Corporation, Tokyo (JP); Aruze Gaming America, Inc., Las Vegas, NV (US)

(72) Inventor: Kengo Takeda, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 758 days.

(21) Appl. No.: 14/371,366

(22) PCT Filed: Dec. 17, 2012

(86) PCT No.: PCT/JP2012/082656
§ 371 (c)(1),
(2) Date: Jul. 9, 2014

(87) PCT Pub. No.: WO2013/105400
PCT Pub. Date: Jul. 18, 2013

(65) Prior Publication Data
US 2014/0349742 A1    Nov. 27, 2014

(30) Foreign Application Priority Data
Jan. 10, 2012   (JP) .................................. 2012-002483

(51) Int. Cl.
*A63F 9/24* (2006.01)
*G07F 17/32* (2006.01)
(Continued)

(52) U.S. Cl.
CPC ..... *G07F 17/3244* (2013.01); *G06Q 20/0457* (2013.01); *G06Q 20/381* (2013.01);
(Continued)

(58) Field of Classification Search
CPC .. G06Q 20/381; G06Q 20/0457; G06Q 30/04; G06Q 40/02; G06Q 30/06;
(Continued)

(56) References Cited

U.S. PATENT DOCUMENTS

| 6,048,269 A | 4/2000 | Burns et al. |
| 2002/0111206 A1 | 8/2002 | Van Baltz et al. |

(Continued)

FOREIGN PATENT DOCUMENTS

| AU | 2009347026 | 12/2010 |
| JP | 7-505079 | 6/1995 |

(Continued)

OTHER PUBLICATIONS

International Search Report (PCT/ISA/210) from underlying PCT Application No. PCT/JP2012/082656.
(Continued)

*Primary Examiner* — Justin L Myhr
(74) *Attorney, Agent, or Firm* — Potomac Law Group, PLLC; Kenneth Fagin (57) ABSTRACT

Provided is a system that is capable of adding a multi-currency function to an existing ticket/cashless server. The system according to the present application communicates information to issue a barcode ticket for taking out a credit from a gaming machine via a path connected with a game controller and, in the case of receipt of a bill, sends information on the bill to the ticket/cashless server via a path different from the path.

7 Claims, 6 Drawing Sheets

(51) Int. Cl.
*G06Q 20/38* (2012.01)
*G06Q 40/02* (2012.01)
*G06Q 30/06* (2012.01)
*G07F 17/42* (2006.01)
*G06Q 20/04* (2012.01)
*G06Q 30/04* (2012.01)

(52) U.S. Cl.
CPC ............ *G06Q 30/04* (2013.01); *G06Q 30/06* (2013.01); *G06Q 40/02* (2013.01); *G07F 17/3248* (2013.01); *G07F 17/42* (2013.01)

(58) Field of Classification Search
CPC ............ G07F 17/3246; G07F 17/3244; G07F 17/3248; G07F 17/42; G07F 17/3202
See application file for complete search history.

(56) References Cited

U.S. PATENT DOCUMENTS

| | | | |
|---|---|---|---|
| 2003/0036425 | A1 | 2/2003 | Kaminkow et al. |
| 2005/0096126 | A1 | 5/2005 | Prasad et al. |
| 2005/0282626 | A1 | 12/2005 | Manfredi et al. |
| 2006/0160626 | A1* | 7/2006 | Gatto ................ A63F 13/12 463/43 |
| 2009/0131186 | A1* | 5/2009 | Martin ................ G07F 17/38 473/24 |
| 2010/0048281 | A1* | 2/2010 | Kearns ................ G07F 17/3202 463/20 |
| 2010/0304853 | A1 | 12/2010 | Kukita |
| 2011/0195775 | A1* | 8/2011 | Wells ................ G07F 9/026 463/29 |
| 2012/0109765 | A1* | 5/2012 | Araque ................ G06Q 30/0601 705/26.1 |
| 2012/0115586 | A1 | 5/2012 | Okada et al. |
| 2013/0065667 | A1* | 3/2013 | Nelson ................ G07F 17/3223 463/25 |

FOREIGN PATENT DOCUMENTS

| | | |
|---|---|---|
| JP | 2004-240778 | 8/2004 |
| JP | 2005-504594 | 2/2005 |
| JP | 2005-534417 | 11/2005 |
| JP | 2011-5220 | 1/2011 |
| WO | WO 2010/137184 | 12/2010 |
| WO | WO 2010/137187 | 12/2010 |
| WO | WO 2013/105400 | 7/2013 |

OTHER PUBLICATIONS

International Search Report (PCT/ISA/220) from underlying PCT Application No. PCT/JP2012/082656.
Written Opinion (PCT/ISA/237) from underlying PCT Application No. PCT/JP2012/082656.
Translation of Written Opinion (PCT/ISA/237) from underlying PCT Application No. PCT/JP2012/082656.

* cited by examiner

SYSTEM CAPABLE OF ADDING MULTI-CURRENCY FUNCTION

TECHNICAL FIELD

The present invention relates to a multi-currency system which is capable of adding a multi-currency function to an existing gaming system having a single currency system. More specifically, the present invention relates to a multi-currency system that can handle domestic currency bills, foreign currency bills, and barcode tickets.

BACKGROUND ART

The currency system employed for traditional gaming machines has been the single currency system that can handle a single currency, for example, only the domestic currency of the country where a gaming facility equipped with such gaming machines is located. Specifically, the currency system installed in a gaming facility can accept domestic currency bills. However, in places such as a tourist resort that gather players from various countries, various currencies are supposed to be brought. For the players from various countries to play games, gaming facilities located at such a place have to provide services to exchange cash owned by the players to the cash in the domestic currency. The gaming facilities have provided multiple exchange counters to address this problem. However, currency exchanges are troublesome for both of the gaming facilities and the players. Since the operations of currency exchange are complicated and bothersome, some players may leave the gaming facility without playing game, causing decrease in income of the gaming facility.

In the meanwhile, some traditional currency systems installed in gaming facilities include a system that issues a barcode ticket at paying out. Such systems have achieved cashless systems, which pay out cash as least as possible. In a typical cashless system, the information about the barcode ticket is sent from a game controller for controlling a gaming machine to a management server (issuance server).

This traditional currency system is a system that accepts cash in a domestic currency or a barcode ticket and sends information about the income to the management server (including an issuance server) via the game controller for controlling the gaming machine; it is arranged to keep security but is not arranged to support foreign currencies. At present day when cashless systems are common, desired is a cashless system supporting multiple currencies that can directly accept cash in foreign currencies. However, the traditional cashless systems originally do not support multiple currencies; they cannot be easily modified to multi-currency cashless systems.

Furthermore, the aforementioned traditional cashless system may be commonly used in gaming facilities such as casinos. Accordingly, demanded by the gaming facilities is modification of a traditional cashless system that can handle domestic currency bills and barcode tickets into a multi-currency cashless system that can additionally handle foreign currency bills without significant effect on the traditional cashless system.

CITATION LIST

Patent Literature

Patent Literature 1: US Patent Application Publication No. 2005/0096126

Patent Literature 2: US Patent Application Publication No. 2005/0282626

SUMMARY OF INVENTION

Technical Problem

The present invention has been accomplished in view of the above-described issues and an object of the present invention is to provide a system for adding a multi-currency function to an existing ticket/cashless system.

Solution to Problem

A multi-currency system according to an embodiment of the present invention comprises:

a gaming machine in which a game controller performs game processing;

an issuance server which communicates information to issue a barcode ticket for taking out a credit from the gaming machine via a path connected with the game controller; and a reception system for receiving a bill to perform the game processing in the gaming machine, and in a case of reception of a bill, the reception system sends information about the bill to the issuance server via a path different from the path.

Usually, to change the specifications of a cashless system already installed so as to support foreign bills, it is necessary to change the communication method and the format of the information to be communicated. The communication paths for all the gaming machines to be modified need change of software and, depending on the conditions, replacement of hardware as well, so that workload for checking might be massive. However, the system configured as above enables modification of an existing cashless system into a system that supports foreign bills almost only with new installation and without change. Hence, a multi-currency function can be easily added to an existing ticket/cashless system.

A multi-currency system according to another embodiment of the present invention comprises:

an issuance system including a gaming machine in which a game controller performs game processing and an issuance server for communicating information to issue a barcode ticket for taking out a credit from the gaming machine, the issuance server communicating information via a transit path which goes through the game controller; and a reception system for receiving a bill to perform the game processing in the gaming machine, the reception system connected with the issuance server to be able to communicate via a non-transit path which does not go through the game controller, the reception system is capable of receiving domestic bills and foreign bills, in a case of reception of a domestic bill, the reception system sends information on an amount of the domestic bill in a domestic currency to the issuance server via the non-transit path, and in a case of reception of a foreign bill, the reception system sends information on an amount of the foreign bill converted into the domestic currency to the issuance server via the non-transit path.

In the multi-currency system according to an embodiment of the present invention, in addition to the foregoing features, in a case of reception of a foreign bill, the reception system convert an amount of the foreign bill at an exchange rate for a currency of the foreign bill and stores the converted amount in association with a gaming machine which has received the foreign bill.

In the multi-currency system according to an embodiment of the present invention, in addition to the foregoing features, the issuance server sends a print instruction to print a validation code for identifying a barcode ticket on the barcode ticket in a barcode style via the different path and stores a credit to be taken out from the gaming machine in association with the validation code, and the multi-currency system determines whether a received barcode ticket is authentic based on barcode data of the received barcode ticket and validation codes stored in the issuance server.

In the multi-currency system according to an embodiment of the present invention, in addition to the foregoing features, in a case of reception of a barcode ticket, the reception system sends barcode data of the received barcode ticket to the issuance server via the different path, and the issuance server determines whether the barcode data sent from the reception system matches any one of stored validation codes.

In the multi-currency system according to an embodiment of the present invention, in addition to the foregoing features, in a case of reception of a barcode ticket, the reception system sends a request to send validation codes to the issuance server via the different path, in response to the request to send validation codes, the issuance server sends stored validation codes to the reception system via the different path, and the reception system determines whether barcode data of the received barcode ticket matches any one of the validation codes sent from the issuance server.

A multi-currency system according to a still another embodiment of the present invention comprises:

an issuance system including a gaming machine in which a game controller performs game processing and an issuance server for communicating information to issue a barcode ticket for taking out a credit from the gaming machine, the issuance server communicating information via a transit path which goes through the game controller; and a reception system for receiving a bill to perform the game processing in the gaming machine, the reception system including a bill acceptor for receiving domestic currency bills and foreign currency bills and a reception server connected with the bill acceptor and the issuance server to be able to communicate, the reception system connected with the issuance server to be able to communicate via a non-transit path which does not go through the game controller, the reception system is capable of receiving domestic bills and foreign bills, in a case of reception of a domestic bill, the reception system sends information on an amount of the domestic bill in a domestic currency to the issuance server via the non-transit path, and in a case of reception of a foreign bill, the reception system sends information on an amount of the foreign bill converted into the domestic currency to the issuance server via the non-transit path.

Advantageous Effects of Invention

A multi-currency function can be easily added to an existing ticket/cashless system.

DESCRIPTION OF EMBODIMENTS

Hereinafter, an embodiment will be described based on the drawings.

<<<Configuration of Multi-Currency System>>>
<<Configurations of Reception System 1 and Issuance System 2>>

Figure 1:
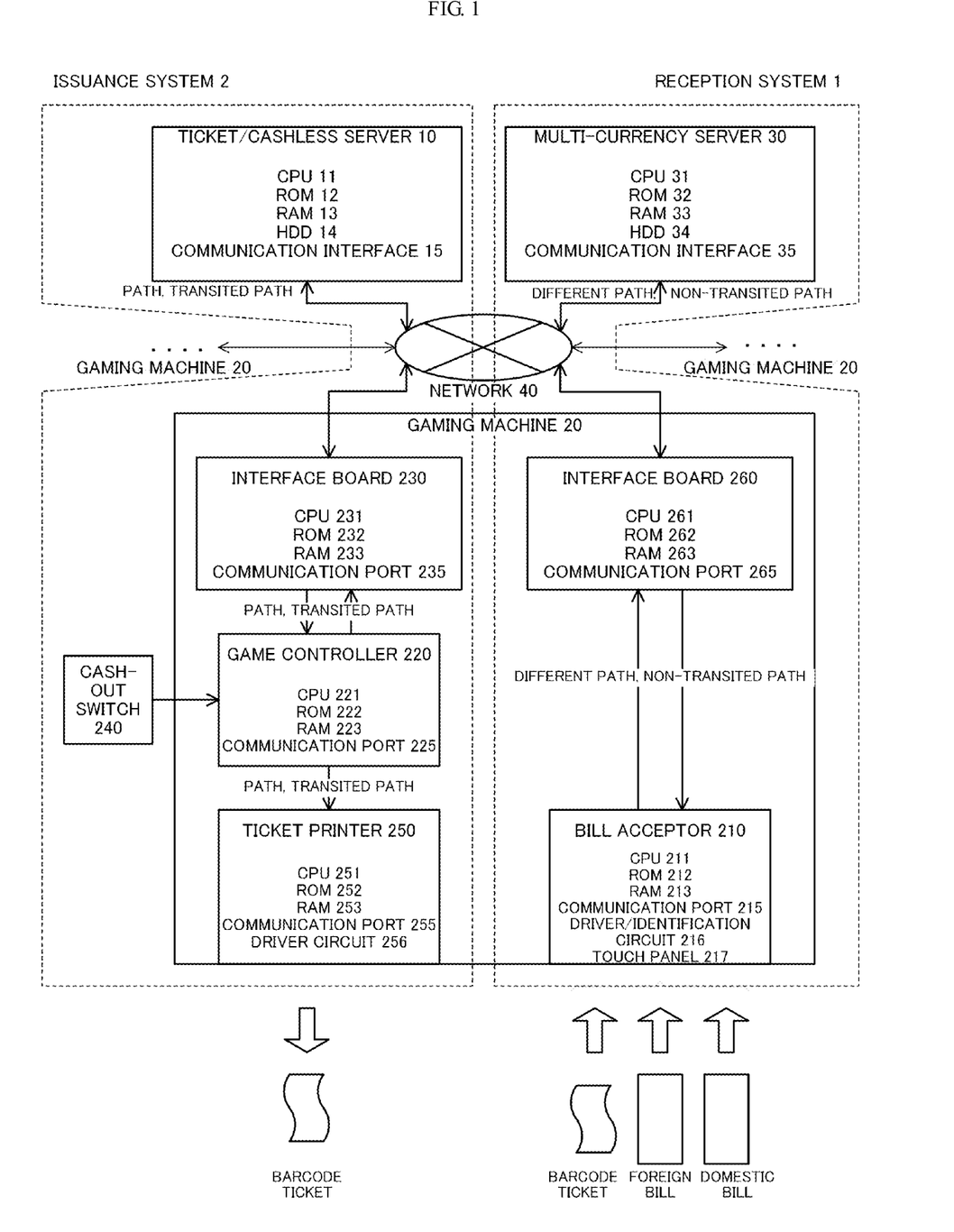
FIG. 1 is a schematic diagram illustrating an overview of a reception system 1 and an issuance system 2 according to an embodiment of the present invention.

FIG. 1 is a schematic diagram illustrating an overview of a multi-currency system according to an embodiment of the present invention. The multi-currency system includes a reception system 1 and an issuance system 2.

The reception system 1 mainly includes a multi-currency server 30, a bill acceptor 210 and an interface board 260 of a gaming machine 20, and a network 40. The issuance system 2 includes a ticket/cashless server 10; a game controller 220, an interface board 230, a cash-out switch 240, and a ticket printer 250 of the gaming machine 20; and the network 40. A gaming machine 20 includes a bill acceptor 210, a game controller 220, an interface board 230, a cash-out switch 240, a ticket printer 250, and an interface board 260.

The gaming machine 20 is connected with the ticket/cashless server 10 and the multi-currency server 30 via the network 40. A plurality of gaming machines 20 are installed in a gaming facility, such as a casino, and connected with the ticket/cashless server 10 and the multi-currency server 30.

<<Multi-Currency System According to Embodiments>>

A multi-currency system according to an embodiment of the present invention comprises:

a gaming machine 20 in which a game controller 220 performs game processing;

an issuance server (ticket/cashless server 10) which communicates information to issue a barcode ticket for taking out a credit from the gaming machine 20 via a path connected with the game controller 220; and a reception system 1 for receiving a bill to perform the game processing in the gaming machine 20, and in a case of reception of a bill, the reception system 1 sends information about the bill to the issuance server via a path different from the path.

The multi-currency system according to an embodiment of the present invention comprises a gaming machine 20, an issuance server, and a reception system 1.

In the gaming machine 20, a game controller 220 performs game processing. The issuance server communicates information to issue a barcode ticket for taking out a credit from the gaming machine 20. This communication uses a path (transit path) between the issuance server and the game controller 220. The reception system 1 receives a bill to perform the game processing in the gaming machine 20. In a case of reception of a bill, the reception system 1 uses a path (non-transit path) different from the foregoing path to send information about the bill to the issuance server.

In this way, the path for transmitting information to issue a barcode ticket to the issuance server and the path for transmitting information about a bill to the issuance server are different. Usually, to change the specifications of a cashless system already installed so as to support foreign bills, it is necessary to change the communication method and the format of the information to be communicated. The communication paths for all the gaming machines to be modified need change of software and, depending on the conditions, replacement of hardware as well. Accordingly, the workload for checking might be massive; however, the system configured as above enables modification of an existing cashless system into a system that supports foreign bills almost only with new installation and without change. Hence, a multi-currency function can be easily added to an existing ticket/cashless system.

A multi-currency system according to another embodiment of the present invention comprises:

an issuance system 2 including a gaming machine 20 in which a game controller 220 performs game processing and an issuance server (ticket/cashless server 10) for communicating information to issue a barcode ticket for taking out a credit from the gaming machine 20, the issuance server communicating information via a transit path which goes through the game controller; and a reception system 1 for receiving a bill to perform the game processing in the gaming machine 20, the reception system 1 connected with the issuance server (ticket/cashless server 10) to be able to communicate via a non-transit path which does not go through the game controller 220, the reception system 1 is capable of receiving domestic bills and foreign bills, in a case of reception of a domestic bill, the reception system 1 sends information on an amount of the domestic bill in a domestic currency to the issuance server via the non-transit path, and in a case of reception of a foreign bill, the reception system 1 sends information on an amount of the foreign bill converted into the domestic currency to the issuance server (ticket/cashless server 10) via the non-transit path.

The multi-currency system according to an embodiment of the present invention comprises an issuance system 2 and a reception system 1.

The issuance system 2 includes a gaming machine 20 and an issuance server (ticket/cashless server 10). The gaming machine 20 includes a game controller 220. The game controller 220 performs game processing. The issuance server sends information to issue a barcode ticket. The barcode ticket is a ticket for a player to take out a credit from the gaming machine 20. The issuance system 2 has a transit path. The transit path is a path that goes through the game controller. The issuance server communicates information via the transit path.

The reception system 1 receives a bill. The bill is a medium for performing game processing in the gaming machine 20. The reception system 1 has a non-transit path. The non-transit path is a different path from the transit path and does not go through the game controller 220. Like the transit path, the non-transit path is connected with the issuance server to be able to communicate.

Players can insert domestic bills and foreign bills in the reception system 1. In the case of insertion of a domestic bill, the reception system 1 sends information on the amount of the domestic bill in the domestic currency to the issuance server via the non-transit path. The information on the amount of the domestic bill in the domestic currency is information indicating the amount of the inserted domestic bill. In the case of insertion of a foreign bill, the reception system 1 sends information on the amount of the foreign bill converted into the domestic currency via the non-transit path. The information on the amount of the foreign bill converted into the domestic currency is information indicating the amount of the inserted foreign bill after converted into the domestic currency.

In this way, in both cases of insertion of a domestic bill and a foreign bill in the reception system 1, information on the amount is sent to the issuance server via the non-transit path, not via the transit path. That is to say, in both cases of insertion of a domestic bill and a foreign bill, the information on the amount is sent to the issuance server without using the transit path of the issuance system 2.

Traditionally, in the case of insertion of a domestic bill, data on the amount of the domestic bill has been sent to the issuance server using the transit path of the issuance system 2. However, after modification into a multi-currency system, data on the amount of a bill is sent to the issuance server using the non-transit path of the reception system 1 in both cases of insertion of a domestic bill and a foreign bill. Since the reception system 1 sends data on the amount of the received bill to the issuance server, the data on the amounts of bills can be collectively managed and monitored.

The issuance system 2 has a transit path that goes through the game controller 220. On the other hand, the reception system 1 has a non-transit path that does not go through the game controller 220. That is to say, the reception system 1 has a non-transit path different from the transit path of the issuance system 2. The reception system 1 can communicate with the issuance server (ticket/cashless server 10) of the issuance system 2 via the non-transit path. Since the reception system 1 has a non-transit path different from the transit path of the issuance system 2, the effect of adding a reception system 1 to the issuance system 2 on the transit path of the issuance system 2 can be minimized. It is supposed that the issuance system 2 has already been installed in a gaming facility. In such a condition, the issuance system 2 can be modified to a multi-currency system by adding a reception system 1 to the issuance system 2. Since the reception system 1 has a non-transit path separate from a transit path of the issuance system 2, the reception system 1 can be easily added to the issuance system 2 so as to provide a multi-currency system.

When a bill such as a domestic bill or a foreign bill is inserted to the reception system 1, the amount of the bill is sent to the issuance server via the non-transit path of the reception system 1. In this way, in the case of insertion of a bill in the reception system 1, data on the amount of the bill can be sent to the issuance server without using the transit path. The data on the amount of the bill sent to the issuance server is forwarded to the game controller 220 via the transit path. In this way, when a bill is inserted in the reception system 1, the data on the amount of the bill is sent to the issuance server via the non-transit path, and then sent to the game controller 220 from the issuance server. Hence, not only in adding the reception system 1 to the issuance system 2, but in reception of a bill, effect on the issuance system 2, particularly effect on the game controller 220, can be minimized.

The reception system 1 has a function of converting the amount of a bill into the domestic currency and forwarding the data on the amount to the issuance system 2. The reception system 1 can convert the amount of an inserted foreign bill into the amount in the domestic currency and forward it to the issuance system. Since the issuance system receives the data on the amount in the domestic currency, modification to the multi-currency system can be achieved without changing the game controller 220 of the gaming machine 20.

In the multi-currency system according to an embodiment of the present invention, it is preferable that the reception system 1 further include a bill acceptor 210 for receiving domestic currency bills and foreign currency bills and that the bill acceptor 210 be connected with the issuance server (ticket/cashless server 10) to be able to communicate via the non-transit path.

Providing the bill acceptor 210 supporting both of domestic bills and foreign bills to the reception system 1 allows insertion of domestic bills and foreign bills in the reception system 1; in both cases of insertion of a domestic bill and a foreign bill, information on the amount of the bill can be sent to the issuance server via the non-transit path.

In the multi-currency system according to an embodiment of the present invention, it is preferable that the reception system 1 include a reception server (multi-currency server 30) connected with the bill acceptor 210 to be able to communicate via the non-transit path and connected with the issuance server to be able to communicate, and that the reception server (multi-currency server 30) store information on the amounts of received domestic bills and foreign bills.

Since the reception server (multi-currency server 30) is provided separately from the issuance server (ticket/cashless server 10), the information on the amounts of received domestic bills and foreign bills can be managed in the reception server without affecting the issuance server. Furthermore, the work for installation of the reception server can be done without affecting the issuance server.

Furthermore, in the multi-currency system according to an embodiment of the present invention, it is preferable that the issuance system 2 manage credits based on the domestic currency in both cases where the reception system 1 receives a domestic bill and a foreign bill.

Since the issuance system 2 manages credits based on the domestic currency, the issuance system 2 is not affected by reception of a foreign bill and the reception server can manage the information on the amounts of received domestic bills and foreign bills without affecting the issuance server. Furthermore, the work for installation of the reception server can be done without affecting the issuance server.

Still further, in a multi-currency system according to an embodiment of the present invention, it is preferable that, in a case of reception of a foreign bill, the reception system 1 convert an amount of the foreign bill at an exchange rate for a currency of the foreign bill and store the converted amount in association with a gaming machine 20 which has received the foreign bill.

Since the reception system 1 converts the amount in a foreign currency into the amount in the domestic currency, modification into a multi-currency system can be achieved without change in the issuance system 2; the work for modification into the multi-currency system can be done without load to the gaming facility.

Figure 4:
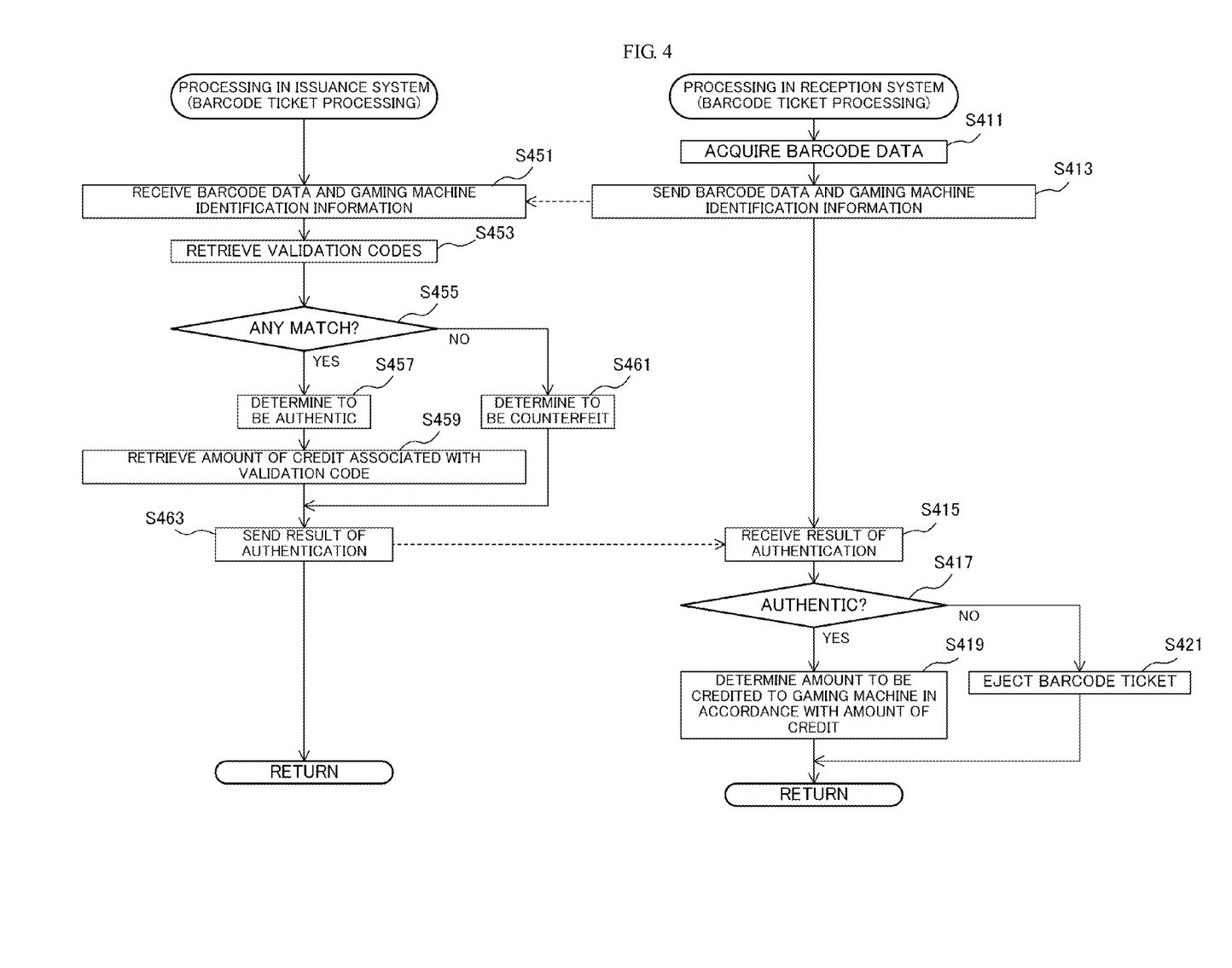
FIG. 4 is a flowchart illustrating an outline of processing in both of the reception system 1 and the issuance system 2 in the case of insertion of a barcode ticket.

In the multi-currency system according to an embodiment of the present invention, it is preferable that the issuance server (ticket/cashless server 10) send a print instruction to print a validation code for identifying a barcode ticket on the barcode ticket in a barcode style via the non-transit path (e.g., later-described Step S223 in FIG. 2) and store a credit to be taken out from the gaming machine in association with the validation code (e.g., later-described Step S219 in FIG. 2), and that the issuance server determine whether a received barcode ticket is authentic based on barcode data of the received barcode ticket and validation codes stored in the issuance server (e.g., later-described Step S455 in FIG. 4).

The multi-currency system that can handle domestic bills, foreign bills, and barcode tickets determines whether a received barcode ticket is authentic. Even if the existing cashless system has been modified to a multi-currency system, the multi-currency system can process a barcode ticket properly as the previous cashless system did. If the issuance system 2 has already been placed in a gaming facility, the issuance system 2 can be easily modified into a multi-currency system by adding a reception system 1 to the issuance system 2 without load to the gaming facility.

Furthermore, in the multi-currency system according to an embodiment of the present invention, it is preferable that, in a case of reception of a barcode ticket, the reception system send barcode data of the received barcode ticket to the issuance server via the non-transit path (e.g., later-described Step S413 in FIG. 4), and that the issuance server determine whether the barcode data sent from the reception system matches any one of stored validation codes (e.g., later-described Step S455 in FIG. 4).

The issuance system 2 determines whether a received barcode ticket is authentic. Consequently, the barcode ticket can be processed in the same way as in the previous cashless system; modification to a multi-currency system can be achieved easily by adding a reception system 1 to the issuance system 2 without load to the gaming facility.

Still further, in the multi-currency system according an embodiment of the present invention, the reception system 1 sends, in a case of reception of a barcode ticket, a request to send validation codes to the issuance server via the non-transit path;

in response to the request to send validation codes, the issuance server sends stored validation codes to the reception system via the non-transit path; and the reception system determines whether barcode data of the received barcode ticket matches any one of the validation codes sent from the issuance server.

Since the reception system 1 determines whether the received barcode ticket is authentic, authentication of the barcode ticket can be performed without load to the issuance system 2.

<<Ticket/Cashless Server 10>>

The ticket/cashless server 10 includes a CPU (Central Processing Unit) 11, a ROM (Read Only Memory) 12, a RAM (Random Access Memory) 13, an HDD (Hard Disk Drive) 14, and a communication interface 15.

The CPU 11 performs a variety of arithmetic processing. The ROM 12 mainly holds programs to be executed by the CPU 11 and constants therefor. The RAM 13 stores data such as parameter values temporarily stored by the CPU 11 executing a program. The HDD 14 holds programs to be executed by the CPU 11 and a variety of data to manage gaming machines 20. The programs held in the ROM 12 and the HDD 14 include the later-described subroutines illustrated in FIGS. 2 and 4 to 6. The communication interface 15 is a device to send and receive a variety of data to and from the multi-currency server 30 and the gaming machines 20.

<<Multi-Currency Server 30>>

The multi-currency server 30 includes a CPU (Central Processing Unit) 31, a ROM (Read Only Memory) 32, a RAM (Random Access Memory) 33, an HDD (Hard Disk Drive) 34, and a communication interface 35.

The CPU 31 performs a variety of arithmetic processing. The ROM 32 mainly holds programs to be executed by the CPU 31 and constants therefor. The RAM 33 stores data such as parameter values temporarily stored by the CPU 31 executing a program. The HDD 34 holds programs to be executed by the CPU 31 and a variety of data to manage gaming machines 20. The programs held in the ROM 32 and the HDD 34 include the later-described subroutine illustrated in FIG. 5. The communication interface 35 is a device to send and receive a variety of data to and from the ticket/cashless server 10 and the gaming machines 20.

<<Gaming Machine 20>>

Each gaming machine 20 includes a bill acceptor 210, a game controller 220, an interface board 230, a cash-out switch 240, a ticket printer 250, and an interface board 260.

<Bill Acceptor 210>

The bill acceptor 210 includes a CPU 211, a ROM 212, a RAM 213, a communication port 215, a driver/identification circuit 216, and a touch panel 217.

The CPU 211 performs a variety of arithmetic processing. The ROM 212 mainly holds programs to be executed by the CPU 211 and constants therefor. The programs held in the ROM 212 include the later-described subroutines illustrated in FIGS. 3, 4, 5, and 6. The RAM 213 holds parameter values temporarily stored by the CPU 211 executing a program. The communication port 215 is a device to send and receive a variety of data to and from the game controller 220.

The driver/identification circuit 216 includes a drive motor (not shown) and a scanner unit (not shown). When a bill or a barcode ticket is inserted, the driver/identification circuit 216 outputs a signal indicating the insertion. Then, in response to an instruction from the CPU 211, the driver/identification circuit 216 takes in the bill or barcode ticket inserted by a player, scans the surface of the bill or barcode ticket, and outputs scan data to the CPU 211. The CPU 211 determines whether the inserted is a bill or a barcode ticket, whether the bill or the barcode ticket is real, and the amount of the bill or the number of credits the barcode ticket values at. The bill acceptor 210 can accept domestic currency bills, foreign currency bills, and barcode tickets.

The touch panel 217 includes a liquid crystal display unit and a touch sensor unit. The liquid crystal display unit displays a variety of character and graphic information in accordance with signals from the CPU 211. The touch sensor unit detects player's operations and outputs corresponding signals to the CPU 211.

<Game Controller 220>

The game controller 220 includes a CPU 221, a ROM 222, a RAM 223, and a communication port 225.

The CPU 221 performs a variety of arithmetic processing. The ROM 222 mainly holds programs to be executed by the CPU 221 and constants therefor. The programs held in the ROM 222 include the later-described subroutine illustrated in FIG. 2. The ROM 222 also holds a game program, which is executed by the CPU 221 so that the player can play games with the gaming machine 20. The RAM 223 holds parameter values temporarily stored by the CPU 221 executing a program. The communication port 225 is a device to send and receive a variety of data to and from the bill acceptor 210, the interface board 230, the cash-out switch 240, and the ticket printer 250.

<Interface Board 230>

The interface board 230 includes a CPU 231, a ROM 232, a RAM 233, and a communication port 235.

The CPU 231 performs a variety of arithmetic processing. The ROM 232 mainly holds programs to be executed by the CPU 231 and constants therefor. The RAM 233 holds parameter values temporarily stored by the CPU 231 executing a program. The communication port 235 is a device to send and receive a variety of data to and from the ticket/cashless server 10, the multi-currency server 30, and the game controller 220.

<Cash-Out Switch 240>

The cash-out switch 240 is a switch operable by a player. The cash-out switch 240 operated by a player outputs a signal indicating the operation of the player to the game controller 220.

To quit playing games, the player operates the cash-out switch 240 for cash-out. As will be described later, in response to the player's operation of the cash-out switch 240, the ticket printer 250 ejects a barcode ticket on which a validation code is printed in the form of barcode. The validation code is information for identifying the barcode ticket and is information to retrieve the amount of credit owned by a player from the ticket/cashless server 10.

<Ticket Printer 250>

The ticket printer 250 includes a CPU 251, a ROM 252, a RAM 253, a communication port 255, and a driver circuit 256.

The CPU 251 performs a variety of arithmetic processing. The ROM 252 mainly holds programs to be executed by the CPU 251 and constants therefor. The RAM 253 holds parameter values temporarily stored by the CPU 251 executing a program. The communication port 255 is a device to send and receive a variety of data to and from the game controller 220. The driver circuit 256 is a circuit to drive a printer engine (not shown) in accordance with instructions from the CPU 251. The printer engine is a device to print and eject a barcode ticket.

<Interface Board 260>

The interface board 260 includes a CPU 261, a ROM 262, a RAM 263, and a communication port 265.

The CPU 261 performs a variety of arithmetic processing. The ROM 262 mainly holds programs to be executed by the CPU 261 and constants therefor. The RAM 263 holds parameter values temporarily stored by the CPU 261 executing a program. The communication port 265 is a device to send and receive a variety of data to and from the ticket/cashless server 10, the multi-currency server 30, and the game controller 220.

<Transit Path (Path)>

Between the game controller 220 and the ticket printer 250, a connection cable is connected to transmit specific instructions and data from the game controller 220 to the ticket printer 250. Between the game controller 220 and the interface board 230, a connection cable is connected to transmit specific instructions and data. Between the interface board 230 and the ticket/cashless server 10, a network 40 is provided to transmit specific instructions and data. These connection cables and network 40 constitute a transit path. In the transit path, the game controller 220 intervenes.
<Non-Transit Path (Different Path)>

Between the bill acceptor 210 and the interface board 260, a connection cable is connected to transmit specific instructions and data. Between the interface board 260 and the multi-currency server 30, the network 40 is provided to transmit specific instructions and data. These connection cable and network 40 constitute a non-transit path. In the non-transit path, the game controller 220 does not intervene.
<<<Processing in Multi-Currency System>>>
<<Issuance System Processing>>

Figure 2:
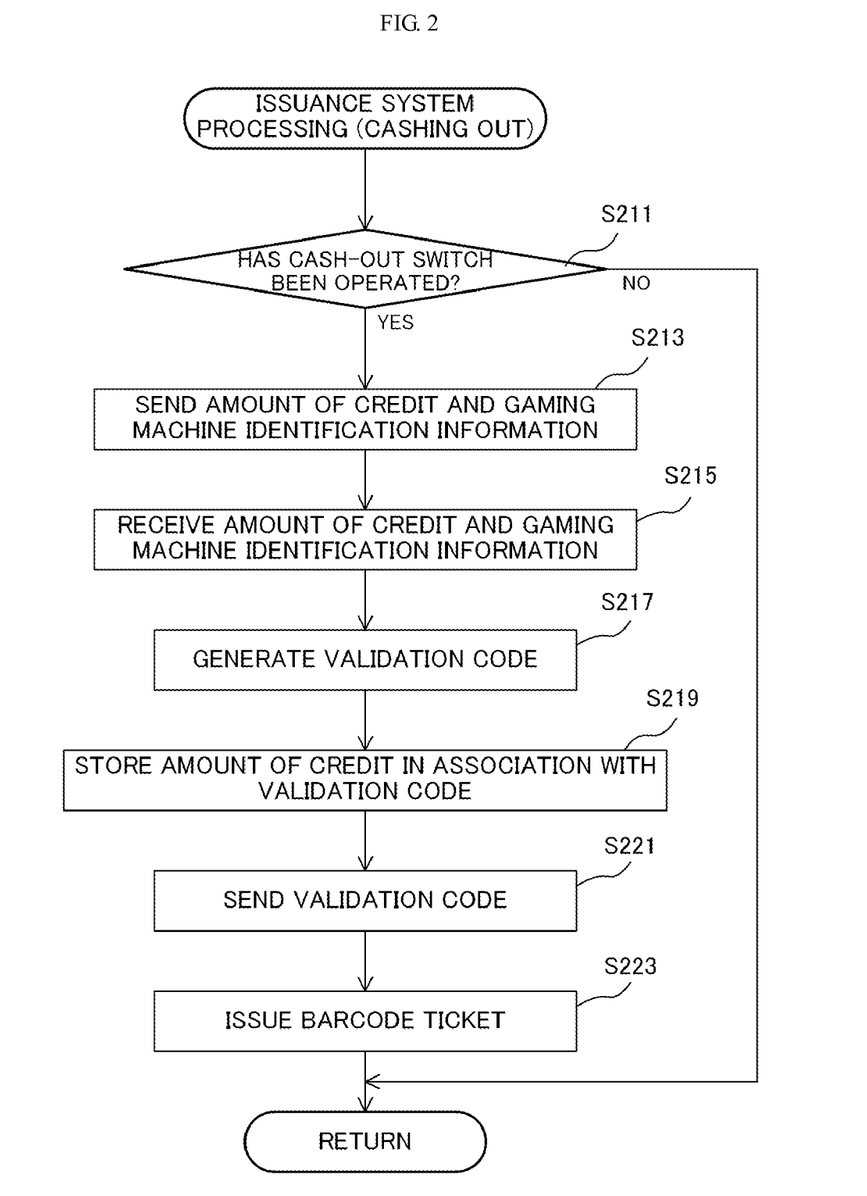
FIG. 2 is a flowchart illustrating cashing out in the issuance system 2.

FIG. 2 is a flowchart illustrating cashing out in the issuance system 2. As mentioned above, the issuance system 2 mainly includes the ticket/cashless server 10 and the game controller 220, the cash-out switch 240, and the ticket printer 250 of a gaming machine 20.

The flowchart of FIG. 2 illustrates an overall concept of cashing out in the issuance system 2. Steps S211, S213, and S223 in the flowchart of FIG. 2 are performed by the CPU 221 of the game controller 220. Steps S215, S217, S219, and S221 in the flowchart of FIG. 2 are performed by the CPU 11 of the ticket/cashless server 10. Hence, the flowchart of FIG. 2 shows processing in the ticket/cashless server 10 and processing in the game controller 220 together.

First, the CPU 221 of the game controller 220 determines whether the cash-out switch 240 has been operated by a player (Step S211). If the determination is that the cash-out switch 240 has not been operated by a player (NO), the CPU 221 of the game controller 220 immediately exits this subroutine.

If the determination is that the cash-out switch 240 has been operated (YES), the CPU 221 of the game controller 220 sends the amount of credit and the gaming machine identification information to the ticket/cashless server 10 (Step S213).

The amount of credit means the amount of credit remaining in the gaming machine 20 at the time of operation of the cash-out switch 240. The amount of the remaining credit is the amount of the credit owned by the player in the gaming facility.

The gaming machine identification information is information for identifying the gaming machine with which the player is playing games. Specifically, it is information for identifying the gaming machine connected with the cash-out switch 240 operated by the player. Gaming machine identification information is assigned to each of the plurality of gaming machines 20 placed in the gaming facility. The plurality of gaming machines 20 placed in the gaming facility can be individually identified with the gaming machine identification information.

Next, the CPU 11 of the ticket/cashless server 10 receives the amount of credit and the gaming machine identification information sent from the game controller 220 (Step S215).

Next, in response to the receipt of the amount of credit and the gaming machine identification information, the CPU 11 of the ticket/cashless server 10 generates a validation code (Step S217).

The validation code is information for identifying a barcode ticket to be issued by the ticket printer 250 and information to retrieve the amount of credit stored in a validation code management database (Steps S455 to S459 in FIG. 4 to be described later). Validation codes are unique information assigned to individual barcode tickets handled in the gaming facility to identify the barcode tickets. The validation codes are collectively managed by, for example, the ticket/cashless server 10 so as to identify all the barcode tickets handled in the gaming facility. The validation codes enable determination of whether a barcode ticket is authentic.

Next, the CPU 11 of the ticket/cashless server 10 associates (ties) the amount of credit with the validation code and stores them to a validation code management database (Step S219). The validation code management database enables management of validation codes and the amounts of credits owned by the players corresponding to the validation codes.

The validation code management database may store, in addition to the amounts of credits, the times and dates of issuance of barcode tickets, gaming machine identification information on gaming machines 20 with which players play games, and identification information for identifying the ticket printers 250 connected with the gaming machines 20 in association with validation codes. Associating a variety of information with validation codes increases the accuracy in verification of validation codes.

The validation code may be generated in any one of the ticket/cashless server 10, the game controller 220, and the ticket printer 250. In any case, required is that the validation code is unique information for identifying a barcode ticket with which the amount of credit can be retrieved from the validation code management database.

Next, the CPU 11 of the ticket/cashless server 10 sends the validation code generated at Step S217 to the game controller 220 (Step S221).

The CPU 221 of the game controller 220 forwards the validation code to the ticket printer 250, which prints the validation code in the form of a barcode and issues a barcode ticket (Step S223).

It should be noted that, at Step S223, the ticket printer 250 may print not only the validation code but also the amount of credit owned by the player, the time and date of issuance of the barcode ticket, the gaming machine identification information, and the identification information of the ticket printer 250. The only requirement is that the validation code be printed in the form of a barcode; the other information such as the amount of credit may be printed in a barcode or text. Alternatively, all information may be printed in a barcode.

The flowchart of FIG. 2 illustrates cashing out in the issuance system 2; the information and instructions are transmitted through the transit path that goes through the game controller 220.
<<Reception System Processing>>

Figure 3:
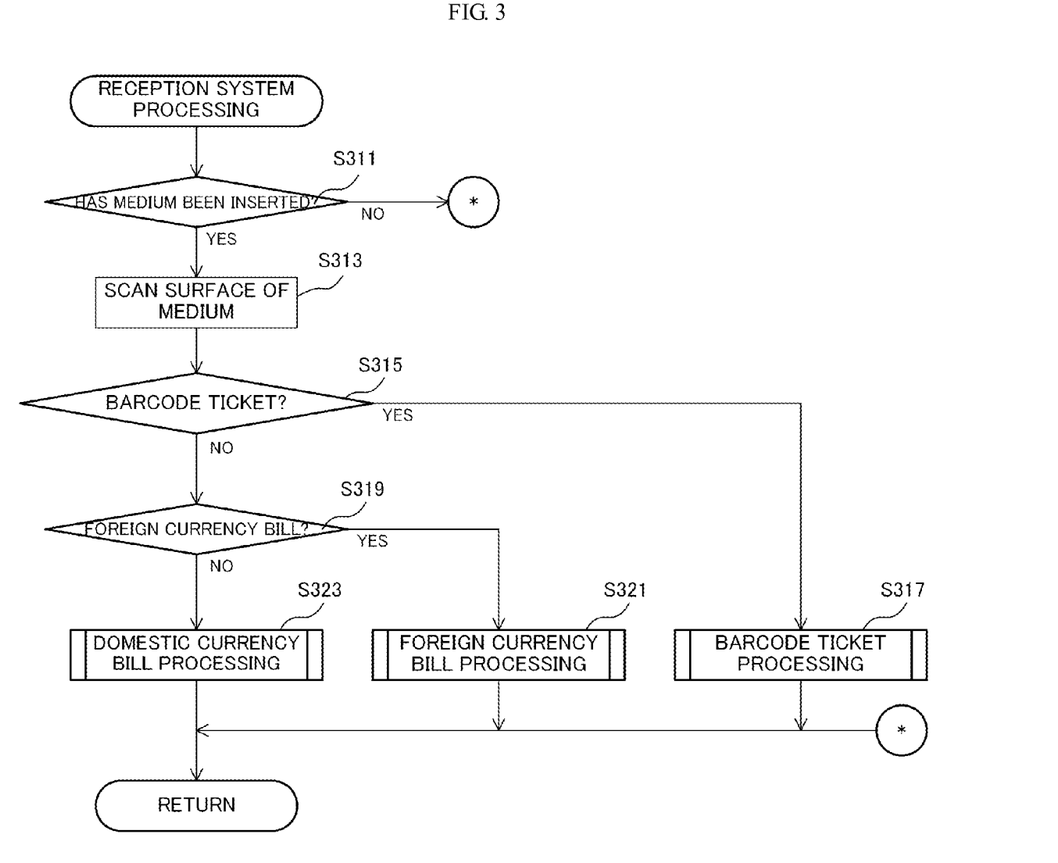
FIG. 3 is a flowchart illustrating medium reception processing in response to insertion of a medium in the reception system 1.

FIG. 3 is a flowchart illustrating medium reception processing when a medium is inserted in the reception system 1. As mentioned above, the reception system 1 mainly includes the multi-currency server 30 and the bill acceptor 210 of a gaming machine 20.

The flowchart of FIG. 3 illustrates an overall concept of the medium reception processing in the reception system 1. Steps S311, S313, S315, and S319 in the flowchart of FIG. 3 are performed by the CPU 211 of the bill acceptor 210. Steps S317, S321, and S323 in the flowchart of FIG. 3 are performed by both of the reception system 1 and the issuance system 2, which will be described later.

First, the CPU 211 of the bill acceptor 210 determines whether any medium such as a bill or a barcode ticket has been inserted in the bill acceptor 210 (Step S311).

Next, the CPU 211 of the bill acceptor 210 scans and reads the surface of the inserted medium (Step S313).

Next, the CPU 211 of the bill acceptor 210 determines whether the inserted medium is a barcode ticket (Step S315). If the determination is that the inserted medium is a barcode ticket (YES), the CPU 211 of the bill acceptor 210 invokes and executes barcode ticket processing illustrated in FIG. 4 (Step S317), and exits this subroutine.

If the determination is that the inserted medium is not a barcode ticket (NO), the CPU 211 of the bill acceptor 210 determines whether the inserted medium is a foreign currency bill (Step S319). If the determination is that the inserted medium is a foreign currency bill (YES), the CPU 211 of the bill acceptor 210 invokes and executes foreign currency bill processing illustrated in FIG. 5 (Step S321), and exits this subroutine.

Figure 6:
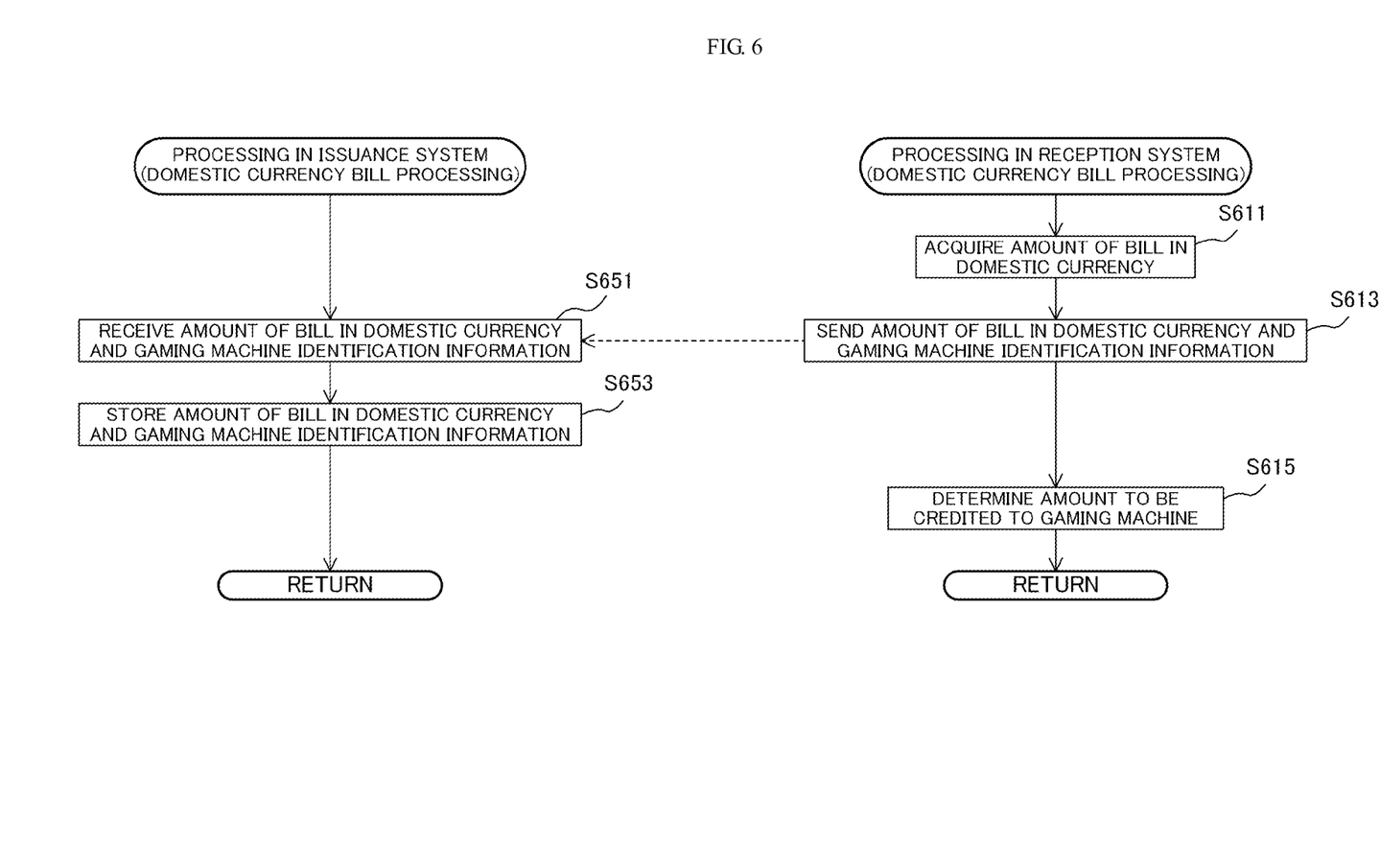
FIG. 6 is a flowchart illustrating an outline of processing in both of the reception system 1 and the issuance system 2 in the case of insertion of a domestic currency bill.

If the determination is that the inserted medium is not a foreign currency bill (NO), the CPU 211 of the bill acceptor 210 invokes and executes domestic currency bill processing illustrated in FIG. 6 (Step S323), and exits this subroutine.

The foregoing Steps S311 to S319 are reception system processing in the reception system 1; the information and instructions are transmitted via the non-transit path which does not go through the game controller 220.

<<Barcode Ticket Reception Processing>>

FIG. 4 is a flowchart illustrating an outline of processing in both of the reception system 1 and the issuance system 2 in the case of insertion of a barcode ticket. Steps S411 to S421 in the flowchart of FIG. 4 are the processing in the reception system 1. Steps S451 to S463 in the flowchart of FIG. 4 are the processing in the issuance system 2.

Step S411 in the flowchart of FIG. 4 is performed by the CPU 211 of the bill acceptor 210. Steps S413, S415, S417, S419, and S421 in the flowchart of FIG. 4 are performed by the CPU 31 of the multi-currency server 30. Steps S451 to S463 in the flowchart of FIG. 4 are performed by the CPU 11 of the ticket/cashless server 10.

First, in the reception system 1, the CPU 211 of the bill acceptor 210 acquires barcode data (Step S411). The barcode data can be acquired from the result of scanning the surface of the inserted medium at Step S313 in FIG. 3.

The CPU 211 of the bill acceptor 210 sends the barcode data acquired at Step S411 and gaming machine identification information to the multi-currency server 30 via the interface board 260; the multi-currency server 30 sends the barcode data and the gaming machine identification information to the ticket/cashless server 10 (Step S413).

The above-described example provided a case that the barcode data and the gaming machine identification information are sent from the multi-currency server 30 to the ticket/cashless server 10; however, they may be sent from the interface board 260 to the ticket/cashless server 10 not via the multi-currency server 30.

Next, in the issuance system 2, the CPU 11 of the ticket/cashless server 10 receives the barcode data and the gaming machine identification information (Step S451).

Next, in the issuance system 2, the CPU 11 of the ticket/cashless server 10 retrieves the validation codes held in the validation code management database (Step S453).

Next, in the issuance system 2, the CPU 11 of the ticket/cashless server 10 determines whether the barcode data received at Step S451 matches any one of the validation codes retrieved at Step S453 (Step S455).

If, in the issuance system 2, the determination is that the barcode data matches one of the validation codes held in the validation code management database (YES), the CPU 11 of the ticket/cashless server 10 determines that the barcode ticket inserted in the bill acceptor 210 in the reception system 1 is an authentic barcode ticket (Step S457).

Next, in the issuance system 2, the CPU 11 of the ticket/cashless server 10 retrieves the amount of credit associated with the validation code from the validation code management database (Step S459).

If, in the issuance system 2, the determination at Step S455 is that the barcode data does not match any one of the validation codes held in the validation code management database (NO), the CPU 11 of the ticket/cashless server 10 determines that the barcode ticket inserted in the bill acceptor 210 in the reception system 1 is a counterfeit barcode ticket (Step S461).

After Step S459 or S461 is performed in the issuance system 2, the CPU 11 of the ticket/cashless server 10 sends the result of the authentication determined at Step S457 or S461 to the multi-currency server 30 in the reception system (Step S463).

If the determination at the foregoing Step S455 is that the barcode ticket is authentic, the CPU 11 of the ticket/cashless server 10 sends the amount of credit retrieved at Step S459 to the multi-currency server 30 together with the result of the authentication.

Next, in the reception system 1, the CPU 31 of the multi-currency server 30 receives the result of the authentication (Step S415).

Next, in the reception system 1, the CPU 31 of the multi-currency server 30 determines whether the result of the authentication indicates the barcode ticket is authentic (Step S417).

If, in the reception system 1, the determination is that the result of the authentication indicates the barcode ticket is authentic (YES), or if the barcode ticket inserted in the bill acceptor 210 is determined to be authentic, the CPU 31 of the multi-currency server 30 determines the amount to be credited to the gaming machine 20 in accordance with the amount of credit received together with the result of the authentication (Step S419).

In contrast, if the determination at Step S417 is that the result of the authentication indicates that the barcode ticket is counterfeit (NO), or if the barcode ticket inserted in the bill acceptor 210 is determined to be counterfeit, the CPU 31 of the multi-currency server 30 sends an instruction to eject the barcode ticket inserted in the bill acceptor 210 to the bill acceptor 210 via the interface board 260 (Step S421). In this way, if the barcode ticket is identified as a counterfeit barcode ticket, the bill acceptor 210 ejects the barcode ticket without accepting it.

The foregoing Steps S411 to S421 are barcode ticket processing in the reception system 1; the information and instructions are transmitted through the non-transit path that does not go through the game controller 220. Steps S451 to S463 are barcode ticket processing in the issuance system 2; the information and instructions are transmitted through the transit path that goes through the game controller 220.

<<Foreign Currency Bill Reception Processing>>

Figure 5:
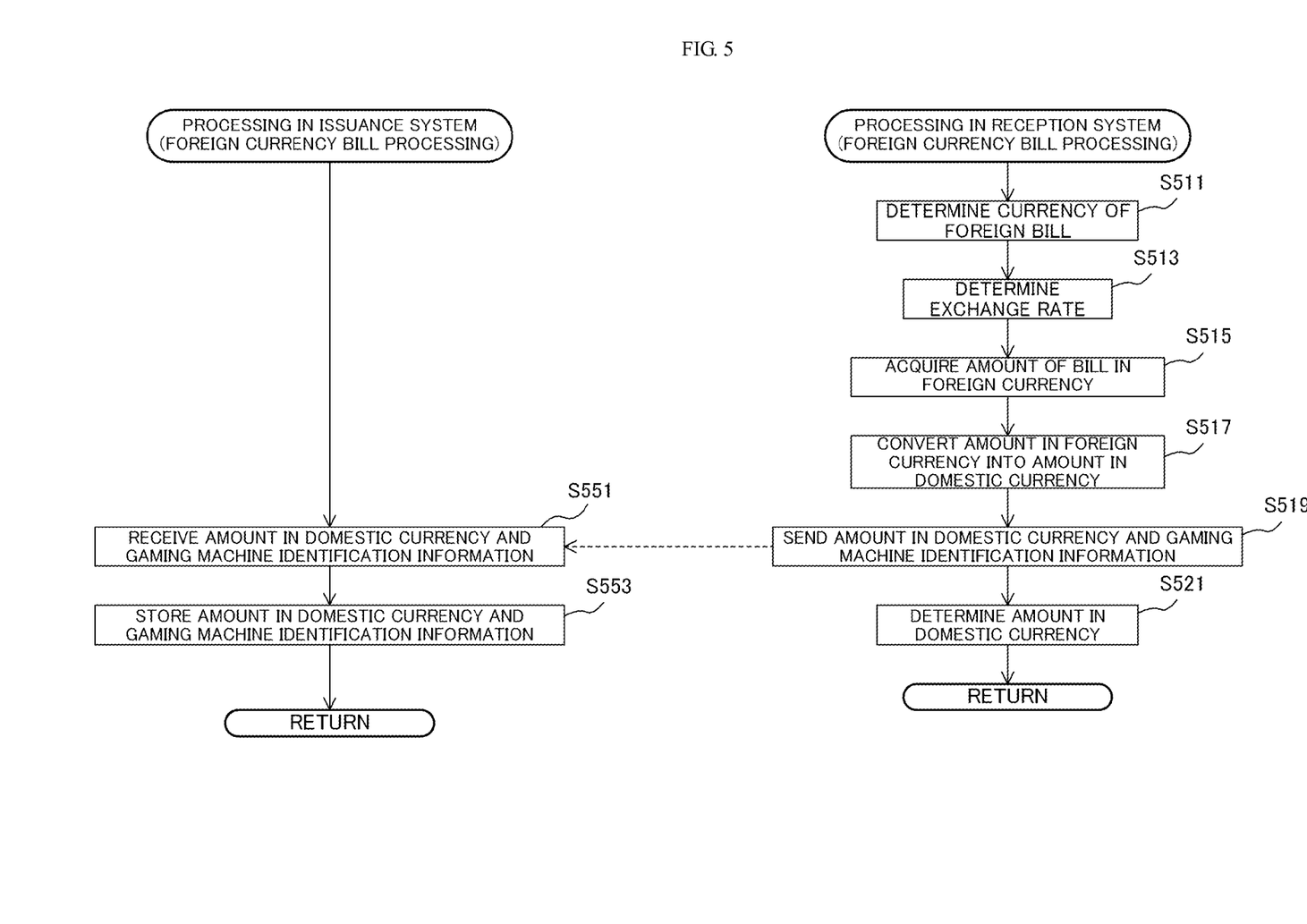
FIG. 5 is a flowchart illustrating an outline of processing in both of the reception system 1 and the issuance system 2 in the case of insertion of a foreign currency bill.

FIG. 5 is a flowchart illustrating an outline of processing in both of the reception system 1 and the issuance system 2 in the case of insertion of a foreign currency bill. Steps S511 to S521 in the flowchart of FIG. 5 are the processing in the reception system 1. Steps S551 and S553 in the flowchart of FIG. 5 are the processing in the issuance system 2.

Steps S511 to S517 and S521 in the flowchart of FIG. 5 are performed by the CPU 211 of the bill acceptor 210. Step S519 in the flowchart of FIG. 5 is performed by the multi-currency server 30. Steps S551 and S553 in the flowchart of FIG. 5 are performed by the CPU 11 of the ticket/cashless server 10.

First, in the reception system 1, the CPU 211 of the bill acceptor 210 determines the foreign currency (Step S511). The foreign currency can be determined from the result of scanning the surface of the inserted medium at Step S313 in FIG. 3. Furthermore, whether the foreign currency bill is genuine can be also determined by the bill acceptor 210 from the result of scanning the surface of the inserted medium. Reference data characterizing the surfaces of foreign currency bills may be prepared in the ROM 212 of the bill acceptor 210 and the CPU 211 of the bill acceptor may compare a result of scanning the surface of an inserted medium with them to determine whether the inserted foreign currency bill is genuine.

Next, the CPU 211 of the bill acceptor 210 determines an exchange rate for the determined foreign currency (Step S513).

Exchange rates are sent from the multi-currency server 30 or the ticket/cashless server 10 to the bill acceptor 210 via the network 40, so that the exchange rates in the bill acceptor 210 can be updated to the latest ones. The multi-currency server 30 or the ticket/cashless server 10 receives the latest exchange rates from a specific server providing exchange rates through the network 40 to update the exchange rates in the multi-currency server 30 or the ticket/cashless server 10 into the latest ones.

Next, the CPU 211 of the bill acceptor 210 acquires the amount of the foreign currency bill inserted in the bill acceptor 210 (Step S515). The amount of the foreign currency bill can be determined from the result of scanning the surface of the inserted medium at Step S313 in FIG. 3.

Next, the CPU 211 of the bill acceptor 210 converts the amount in the foreign currency into the amount in the domestic currency at the exchange rate (Step S517).

Next, the CPU 211 of the bill acceptor 210 sends the amount in the domestic currency and the gaming machine identification information to the multi-currency server 30 via the interface board 260 and the multi-currency server 30 forwards the amount in the domestic currency and the gaming machine identification information to the ticket/cashless server 10 (Step S519).

Next, the CPU 211 of the bill acceptor 210 determines that the amount in the domestic currency after the conversion at Step S517 is the amount to be credited to the gaming machine 20 (Step S521).

In the issuance system 2, the CPU 11 of the ticket/cashless server 10 receives the amount in the domestic currency and the gaming machine identification information sent at the foregoing Step S519 (Step S551).

Next, in the issuance system 2, the CPU 11 of the ticket/cashless server 10 stores the received amount in the domestic currency and the gaming machine identification information to a cash management database (Step S553).

The foregoing step enables a foreign currency bill inserted in the bill acceptor 210 to be processed in the same way as a domestic currency bill inserted in the bill acceptor 210.

The foregoing Steps S511 to S521 are processing for a foreign currency bill in the reception system 1; the information and instructions are transmitted via the non-transit path that does not go through the game controller 220. The Steps S551 to S553 are processing for a foreign currency bill in the issuance system 2; the information and instructions are transmitted via the transit path that goes through the game controller 220.

<<Domestic Currency Bill Reception Processing>>

FIG. 6 is a flowchart illustrating an outline of processing in both of the reception system 1 and the issuance system 2 in the case of insertion of a domestic currency bill. Steps S611 to S615 in the flowchart of FIG. 6 are the processing in the reception system 1. Steps S651 and S653 in the flowchart of FIG. 6 are the processing in the issuance system 2.

Steps S611 to S615 in the flowchart of FIG. 6 are performed by the CPU 211 of the bill acceptor 210. Step S651 and S653 in the flowchart of FIG. 6 are performed by the CPU 11 of the ticket/cashless server 10.

First, in the reception system 1, the CPU 211 of the bill acceptor 210 acquires the amount of the domestic currency bill inserted in the bill acceptor 210 (Step S611). The amount in the domestic currency can be determined from the result of scanning the surface of the inserted medium at Step S313 in FIG. 3.

Next, the CPU 211 of the bill acceptor 210 sends the amount in the domestic currency and the gaming machine identification information to the multi-currency server 30 via the interface board 260; the multi-currency server 30 forwards the amount in the domestic currency and the gaming machine identification information to the ticket/cashless server 10 (Step S613).

Next, the CPU 211 of the bill acceptor 210 determines the amount in the domestic currency to be the amount to be credited to the gaming machine 20 (Step S615).

In the issuance system 2, the CPU 11 of the ticket/cashless server 10 receives the amount in the domestic currency and the gaming machine identification information sent at the foregoing Step S613 (Step S651).

Next, in the issuance system, the CPU 11 of the ticket/cashless server 10 stores the received amount in the domestic currency and the gaming machine identification information to the cash management database (Step S653).

The foregoing Steps S611 to S615 are processing for a domestic currency bill in the reception system 1; the information and instructions are transmitted via the non-transit path that does not go through the game controller 220. The Steps S651 to S653 are processing for a domestic currency bill in the issuance system 2; the information and instructions are transmitted via the transit path that goes through the game controller 220.

<<<Modified Examples>>>

<<Authentication of Barcode Ticket>>

The foregoing embodiment has described an example that the authentication of a barcode ticket is performed by the ticket/cashless server 10; however, the authentication may be performed by the multi-currency server 30 or the bill acceptor 210. In such a case, the ticket/cashless server 10 sends the validation codes and the amounts of credits held in the validation code management database to the multi-currency server 30 or the bill acceptor 210 via the network 40 as necessary. For example, the ticket/cashless server 10 may sequentially select and send a predetermined number of validation codes to the multi-currency server 30 or the bill acceptor 210. The ticket/cashless server 10 may stop the sending when a validation code matching the barcode data is found.

This method allows the multi-currency server 30 or the bill acceptor 210 to perform authentication using the validation codes held in the validation code management database and barcode data. The ticket/cashless server 10 can reduce its processing load. The network can also reduce the load because the transmission is terminated when a validation code matching the barcode data is found.

<<Validation Code Management Database>>

The foregoing embodiment has described an example that the validation code management table is included in the ticket/cashless server 10; however, the multi-currency server 30 or the bill acceptor 210 may have a database equivalent to the validation code management database. This configuration allows the multi-currency server 30 and/or the bill acceptor 210 to perform authentication of a barcode ticket.

Since the authentication is performed in the multi-currency server 30 and/or the bill acceptor 210, speedy authentication can be performed upon insertion of a barcode ticket.

In the case where the ticket/cashless server 10, the multi-currency server 30, or the bill acceptor 210 have the validation code management databases, they can check their own validation code management databases against the others. If any one of them is tampered, a discrepancy among these validation code management databases leads to speedy detection of the injustice. Furthermore, the effect of the injustice can be reduced and the tampered validation code management database can be easily restored.

In another case, the validation codes of the barcode tickets issued recently, for example in a period of a predetermined days before the current time, such as during this day or until the previous day, may be stored in the validation code management database in the multi-currency server 30 and/or the bill acceptor 210 and the validation codes of the barcode tickets issued before the period may be stored in the validation code management database in the ticket/cashless server 10. Since validation codes more likely to be retrieved are stored in the multi-currency server 30 and/or the bill acceptor 210, speedy authentication of barcode tickets can be performed.

Storing validation codes separately depending on the number of days after issuance of the barcode ticket can reduce the effect of tampering a validation code management database and also enables easy restoration of the validation code management database.

<<Conversion from Foreign Currency to Domestic Currency>>

The foregoing embodiment has described an example that the bill acceptor 210 performs the conversion from a foreign currency into a domestic currency using an exchange rate; however, the conversion from a foreign currency into a domestic currency can be performed in the multi-currency server 30. In the case where the bill acceptor 210 performs the conversion into the domestic currency, the multi-currency server 30 is required to distribute exchange rates to all the bill acceptors 210 installed in the gaming facility to update them every time exchange rates are changed. However, in the case where the multi-currency server 30 performs the conversion into the domestic currency, distributing the data of exchange rates to all the bill acceptors 210 in the gaming facility can be omitted; the processing in the reception system can be simplified and conversion from foreign currencies into the domestic currency can be managed by the multi-currency server 30.

REFERENCE SIGNS LIST

1 Reception system
2 Issuance system
10 Ticket/Cashless server
20 Gaming machine
30 Multi-currency server
210 Bill acceptor
220 Game controller
230 Interface board
250 Ticket printer
260 Interface board

The invention claimed is:

1. A multi-currency system comprising:
an issuance system including a gaming machine in which a game controller performs game processing;
an issuance server which communicates information to issue a barcode ticket for taking out a credit from the gaming machine via a first path connected with the game controller; and
a reception system for receiving a bill to perform the game processing in the gaming machine,
wherein, in the case of reception of a bill in the currency of a first country, 1) the reception system converts the amount of the bill in the currency of the first country to an amount in the currency of a second country and sends information as to the amount of the bill in the currency of the second country to a reception server via a second, non-transit path, which is different from the first path and which does not go through the game controller, and
2) the reception server sends the information as to the amount of the bill in the currency of the second country to the issuance server.

2. A multi-currency system according to claim 1,
wherein, in the case of reception of a bill in the currency of a first country, the reception system converts the amount of the bill in the currency of the first country to an amount in the currency of a second country using at an exchange rate between currencies of the first and second countries and stores the converted amount in association with a gaming machine which has received the foreign bill.

3. A multi-currency system according to claim 1,
wherein the issuance server sends a print instruction to print a validation code for identifying a barcode ticket on the barcode ticket in a barcode style via the second, different path and stores a credit to be taken out from the gaming machine in association with the validation code, and
wherein the multi-currency system determines whether a received barcode ticket is authentic based on barcode data of the received barcode ticket and validation codes stored in the issuance server.

4. A multi-currency system according to claim 1,
wherein, in the case of reception of a barcode ticket, the reception system sends barcode data of the received barcode ticket to the issuance server via the second, different path, and
wherein the issuance server determines whether the barcode data sent from the reception system matches any one of stored validation codes.

5. A multi-currency system according to claim 1,
wherein, in the case of reception of a barcode ticket, the reception system sends a request to send validation codes to the issuance server via the second, different path,
wherein, in response to the request to send validation codes, the issuance server sends stored validation codes to the reception system via the second, different path, and
wherein the reception system determines whether barcode data of the received barcode ticket matches any one of the validation codes sent from the issuance server.

6. A multi-currency system comprising:
an issuance system including a gaming machine in which a game controller performs game processing and an issuance server for communicating information to issue a barcode ticket for taking out a credit from the gaming machine, the issuance server communicating information via a first, transit path which goes through the game controller; and a reception system for receiving a bill to perform the game processing in the gaming machine, the reception system being connected to the issuance server in a manner such that when a bill is received by the reception system, information as to the amount of the bill is sent to a reception server via a second, non-transit path which does not pass through the game controller and the reception server sends the information as to the amount of the bill to the issuance server, wherein the reception system is configured to accept bills in the currency of a first country and bills in the currency of a second country, wherein, in the case of reception of a bill in the currency of the first country, the reception system sends information as to the amount of the bill in the currency of the first country to the reception server via the second non-transit path and the reception server sends the information as to the amount of the bill in the currency of the first country to the issuance server, and wherein, in the case of reception of a bill in the currency of the second country, the reception system sends information as to the amount of the bill in the currency of the second country to the reception server via the second, non-transit path and the reception server sends the information as to the amount of the bill in the currency of the second country to the issuance server.

7. A multi-currency system comprising:

an issuance system including a gaming machine in which a game controller performs game processing and an issuance server for communicating information to issue a barcode ticket for taking out a credit from the gaming machine, the issuance server communicating information via a first, transit path which goes through the game controller; and a reception system for receiving a bill to perform the game processing in the gaming machine, the reception system including a bill acceptor for receiving bills in the currency of a first country and bills in the currency of a second country and a reception server connected with the bill acceptor and the issuance server to be able to communicate, the reception system being configured such that the bill acceptor, the reception server, and the issuance server communicate via a second, non-transit path which does not go through the game controller, wherein the reception system is configured to accept bills in the currencies of both the first and second countries, wherein, in the case of reception of a bill in the currency of the second country, the reception system sends information as to the amount of the bill in the currency of the second country to the reception server, and the reception server converts the amount of the bill in the currency of the second country into an amount in the currency of the first country and sends information as to the amount of the bill in the currency of the first country to the issuance server, and wherein, in the case of reception of a bill in the currency of the first country, the reception system sends information as to the amount of the bill in the currency of the first country to the reception server via the second, non-transit path, and information as to the amount of the bill in the currency of the first country is sent to the issuance server via the second, non-transit path.

* * * * *